(12) United States Patent
El-Shall et al.

(10) Patent No.: US 6,217,706 B1
(45) Date of Patent: Apr. 17, 2001

(54) METHOD OF DE-INKING PAPER AND OTHER CELLULOSIC MATERIALS

(75) Inventors: Hassan El-Shall; Brij M. Moudgil, both of Gainesville, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 09/429,397

(22) Filed: Oct. 28, 1999

(51) Int. Cl.$^7$ .............................. D21B 1/08; D21C 1/06; D21C 1/08

(52) U.S. Cl. ..................................... 162/6; 162/8

(58) Field of Search ................... 162/4, 5, 6, 7, 162/8

(56) References Cited

U.S. PATENT DOCUMENTS 4,586,982 * 5/1986 Poppel et al. .......................... 162/5

* cited by examiner

*Primary Examiner*—Dean T. Nguyen
(74) *Attorney, Agent, or Firm*—Miles & Stockbridge; Dennis P. Clarke

(57) ABSTRACT

A method of de-inking cellulosic fibrous materials comprising:

a. admixing an alkaline reagent selected from the group consisting of ammonium hydroxide and hydrogen peroxide and mixtures thereof with an aqueous suspension of inked cellulosic fibrous material such that they react at the ink particle/cellulosic fiber interfaces to dislodge ink particles from the cellulosic materials; and b. removing the dislodged ink particles from the aqueous suspension.

14 Claims, 5 Drawing Sheets

Process Flow Chart of Proposed Deinking Process

FIG. 1

Process Flow Chart of Proposed Deinking Process

METHOD OF DE-INKING PAPER AND OTHER CELLULOSIC MATERIALS

Research leading to the completion and reduction to practice of the invention was supported in part by Grant No. EEC-9402989 awarded by the National Science Foundation (NSF). The United States Government has certain rights in and to the invention claimed herein.

BACKGROUND OF THE INVENTION

1. Field of the Invention

The present invention relates to a process for the treatment of wastepaper. More particularly, the present invention relates to a process for de-inking wastepaper. Most particularly, the present invention relates to a process for enhanced removal of ink particles and non-ink contaminants from wastepaper.

2. Description of the Prior Art

In modern times, with the ecological concerns about conservation of raw materials and the rapid decline of available landfill space, it has become increasingly desirable to recover and recycle used raw materials. Thus, recovered wastepaper represents a valuable source of raw material for the paper industry. In order for the wastepaper to be regenerated into a viable starting material and to produce a commercially acceptable paper, the wastepaper must be treated to remove any ink particles and non-ink contaminants.

Wastepaper has long served as a source of the raw fiber materials used in paper-making. Traditionally, fiber from wastepaper was utilized only in the production of low grade paper and paperboard products. Today, however, greater utilization of reclaimed fiber has provided incentive for taking steps to upgrade the reclaimed product These steps include treatment to effectively remove ink from waste fibers in order to permit their use in the manufacture of newsprint and high quality papers. Because of its quantity, waste newsprint is a particularly important feedstock to such reclamation processes.

In the course of the conventional paper reclamation process of interest, de-inking procedures include steps for converting the wastepaper to pulp and contacting the pulp with an alkaline aqueous de-inking medium containing a chemical de-inking agent The physical pulping and the alkalinity of the aqueous medium cause the partial removal of ink from the pulp fiber and the de-inking agent completes this removal and produces a suspension and/or dispersion of the ink particles thus removed from the pulp.

The resulting mixture is subsequently treated by flotation or washing to separate the suspended ink from the pulp.

In most conventional de-inking processes, the wash and/or flotation steps are carried out at an alkaline pH, usually 8.5 to 10.5. Conducting the washing or flotation steps at an alkaline pH is convenient because the fluid carried over from the pulping step is alkaline. In addition, many wash de-inking and flotation de-inking processes use fatty acids as surfactants and these fatty acids are capable of functioning as surfactants only when the aqueous medium is sufficiently alkaline to ionize them.

Typically, reclamation is accomplished in two steps:
1. refining the wastepaper, i.e., fiberizing in water in the presence of the chemicals required for detachment of the printing ink particles, and
2. removal of the detached printing ink particles form the fiber suspension.

The second step can be carried out by washing or flotation [*Ullmanns Encyclopaedie der technischen Chemie*, 4th Edition, Vol.17, pages 570–571(1979)]. In flotation, which utilizes the difference in wettability between printing inks and paper fibers, air is forced or drawn through the fiber suspension. Small air bubbles attach themselves to the printing ink particles and form a froth at the surface of the water which is removed.

The de-inking of wastepaper is normally carried out at alkaline pH values in the presence of alkali metal hydroxides, alkali metal silicates, oxidative bleaches and surfactants at temperatures in the range of from 30° to 50° C. Anionic and/or non-ionic surfactants, for example, soaps, ethoxylated fatty alcohols and/or ethoxylated alkyl phenols, are mainly used as surfactants [*Wochenblatt fuer Papierfabrikation*, Vol. 17, pages 646–649 (1985)].

Many prior art processes are known for de-inking wastepaper, many of which are directed to the development of de-inking agents. In U.S. Pat. No. 4,586,982 (Poppel etal), there is described a process comprising treating the wastepaper in a pulper at an alkaline pH with alkali silicate, an oxidatively active bleaching agent, an acid selected from the group consisting of fatty acids and resinic acids containing more than ten carbon atoms and a dispersing agent wherein the acid and dispersing agent are employed together in an oil-in-water emulsion.

Additional disclosures of de-inking agents are set forth by, for example, Wood et al in U.S. Pat. No. 4,618,400 (thiol ethoxylate compounds); Wood et al in U.S. Pat. No. 4,561,933 (a mixture of $C_8$ to $C_{16}$ alkanols and alcohol ethoxylates); DeCeuster et al in U.S. Pat. No. 4,343,679 (compounds capable of liberating ions with a positive charge equal or greater than 2); Bridle in U.S. Pat. No. 4,483,742 (pine oil and a soap-making fatty acid); and Tefft in U.S. Pat. No. 4,786,364 (a hydrolyzed copolymer of dimethyidiallyl ammonium chloride and acrylamide).

Other prior art processes are directed to improvements in either washing or flotation methods of separating ink particles from wastepaper fibers.

In U.S. Pat. No. 4,548,673, Nanda et al describe a de-inking flotation method comprising the steps of independently introducing air into a fiber stock slurry, mixing the air bubbles and slurry, and separating the ink-laden air bubbles from the fiber slurry, where each of these steps is independently controlled. In U.S. Pat. No. 4,749,473, Shiori et al describe introducing air bubbles into the wastepaper pulp slurry through a number of orifices formed on a peripheral surface of at least one rotatable horizontal cylinder located in the bottom portion of a flotation vessel. In U.S. Pat. No. 4,277,328, Pfalzer et al describe employing an impeller at the bottom of a flotation apparatus for dispersing air into the wastepaper pulp slurry.

U.S. Pat. Nos. 4,162,186 and 4,518,459 disclose additional methods.

Such methods were reasonably satisfactory and adequate a number of years ago when there was no need to de-ink and reclaim wastepaper having little or no quantities of ground wood. Such papers were printed with standard inks which are more readily removed or saponified with chemicals at elevated temperatures.

In recent years, however, methods of de-inking which involve cooking and the use of chemicals in aqueous media have become increasingly unsatisfactory for a number of reasons. Ink formulations have become more and more complex and involve an increasing use of a wide variety of synthetic resins and plasticizers; with each ink having its own special formulation. Also, increasing amounts of synthetic resins and plasticizers are being used in a wide variety of sizings, coatings, plastic binding adhesives, thermoplastic resins and pressure sensitive label adhesives. Furthermore, the use of multi-colored printing and multi-colored advertisements have become increasingly popular in recent years and these involve a wide variety of new ink formulations. Many of the new ink formulations incorporate new pigments, dyesand toners which are difficult to remove by conventional aqueous de-inking chemicals. The former methods of de-inking and reclaiming wastepaper by chemical and cooking techniques are not adapted for, or adequate for, removing the new types of inks and coating resins. Due to high contents of thermoplastic resins, the softening action of heat and chemicals alone makes their separation from the fibers very difficult Additionally, the action of heat and chemicals tends to irreversibly set and more firmly bond some of the present day pigments to the fibers and fix dyes and toners to the fibers through staining.

The challenges that the pulp and paper industry is trying to meet today in the recycling area are to (1) economically produce quality paper meeting the consumer demands and also the legislative demands for the content of recycled paper; and (2) increase the process efficiency in order to make use of recovered paper which currently cannot be processed economically. Currently, most recycling processes are geared only to use high quality recovered paper costing over $150 per ton. Such material is limited in quantity and is in high demand due to the regulations governing the incorporation of certain percentages of recycled fiber in many paper commodities. There exists a need for new recycling processes which are more economical and can handle a wider range of recovered paper. One of the most important steps in recycling the recovered paper is that of de-inking. There also exists a need for methods of de-inking that can handle (1) a wider variety of printed material (newsprint to high quality glossy magazine paper) and (2) a higher pulp density than the conventional processes.

For the above and other reasons, conventional de-inking techniques used in reclaiming processes for wastepaper are no longer efficient or effective for many current needs.

The need for a satisfactory de-inking process has become increasingly important due to greatly expanded utilization of paper and difficulty in disposal of the old papers due to projected lack of landfill sites.

In this regard, to preserve natural resources and minimize environmental problems, the need for developing useful and efficient paper recycling processes becomes of critical importance.

SUMMARY OF THE INVENTION

The present invention solves the need for more efficient processes for recycling cellulosic materials by providing a novel method for de-inking such material.

One embodiment of the invention is a method of de-inking cellulosic fibrous materials comprising:

a. admixing an alkaline reagent selected from the group consisting of ammonium hydroxide and sodium bicarbonate or mixture thereof with hydrogen peroxide and an aqueous suspension of inked cellulosic fibrous material in amounts whereby said ammonium hydroxide and hydrogen peroxide react at the ink particle/cellulosic fiber interfaces to dislodge said ink particles from said cellulosic materials; and b. removing said dislodged ink particles from said aqueous suspension.

Another embodiment of the invention relates to an improved process for recycling inked cellulosic material which includes the above-described step of de-inking prior to recovery of the cellulosic material.

DETAILED DESCRIPTION OF THE INVENTION

The present invention is predicated on the discovery that the process of the invention enables the de-inking of a broad spectrum of printed products including newspaper, laser written paper, xerographic paper, rotogravure, heat-set, including coated and uncoated stock and high gloss multi-colored paper, such as magazines. Moreover, the process enables the de-inking of higher pulp densities than typical prior art methods.

As noted above, in conventional de-inking processes, the waste paper is first pulped and the ink particles are removed by using a flotation technique. In this step, the pulp at a solids loading of 1.0–1.25 wt % is treated with various reagents to separate the ink particles from the fiber. The pH of the pulp is adjusted using NaOH. Reagents are then added to emulsify or discharge the ink particles from the fiber interface and a collector is added to float the liberated ink particles. Air is sparged into the pulp stream in order to aid the flotation process. Typical de-inking process chemicals currently used are shown in Table 1.

TABLE 1

DE-INKING PROCESS CHEMICALS
JOHN K. BORCKHARDT, CHEMISTRY AND INDUSTRY, VOL. 19, PAGE 273 (APRIL 1993)

| PROCESS STAGE | CHEMICAL | FUNCTION |
| --- | --- | --- |
| Pulper | Sodium Hydroxide | Raises pH to 8–10 (typically about 9 to promote fiber swelling and ink removal, as well as disaggregation of paper into separate fibers (pulp) |
| | Sodium Silicate | Dispersant for detached ink particles, raises pH |
| | Hydrogen Peroxide | Prevents lignin yellowing of pulp promoted by high pH |
| | Complexing Agent | Stabilizes hydrogen peroxide so it does not react with oxidizable dis- |

TABLE 1-continued

DE-INKING PROCESS CHEMICALS
JOHN K. BORCKHARDT, CHEMISTRY AND INDUSTRY, VOL. 19, PAGE 273 (APRIL 1993)

| PROCESS STAGE | CHEMICAL | FUNCTION |
|---|---|---|
| | | solved metal ions. Usually diethylenepentaminetetraacetic acid (DTPA) or ethylenediaminetetraacetic acid (EDTA) |
| | Surfactant | Promotes ink detachment from cellulose fiber |
| Flotation Cell | Fatty Acid | Renders ink particles hydrophobic and stabilizes foam. Used in combination with a soluble calcium salt, usually calcium chloride, to generate a calcium soap in situ |
| | Synthetic Surfactant | Renders ink particles hydrophobic and stabilizes foam. May be added at the pulper to promote ink detachment from fiber and carried forward to the flotation stage |
| Washing Stage(s) | Synthetic Surfactant | Added in the pulper to promote ink dispersion into small particles that are readily removed by washing |
| Bleaching | Hydrogen Peroxide[a] Sodium Hypochlorite[a] Chloride Dioxide[a] Sodium Hydrosulphite[b,c] FAS[b,d] | Whitens the pulp and increases paper sheet brightness |

[a]Oxidative bleach
[b]Reductive bleach
[c]Sodium dithionite
[d]Formamidine sulphinic acid In the method of the invention, in the de-inking step, the pulp is treated with a novel reagent scheme which is far less costly than conventional de-inking and flotation reagents. Briefly, to a pulp stream are added a soluble peroxide and a soluble alkaline agent capable of undergoing a reaction with the peroxide to liberate a bubble of gas which functions to float the ink particles in the pulp stream to the surface.

Figure 1:
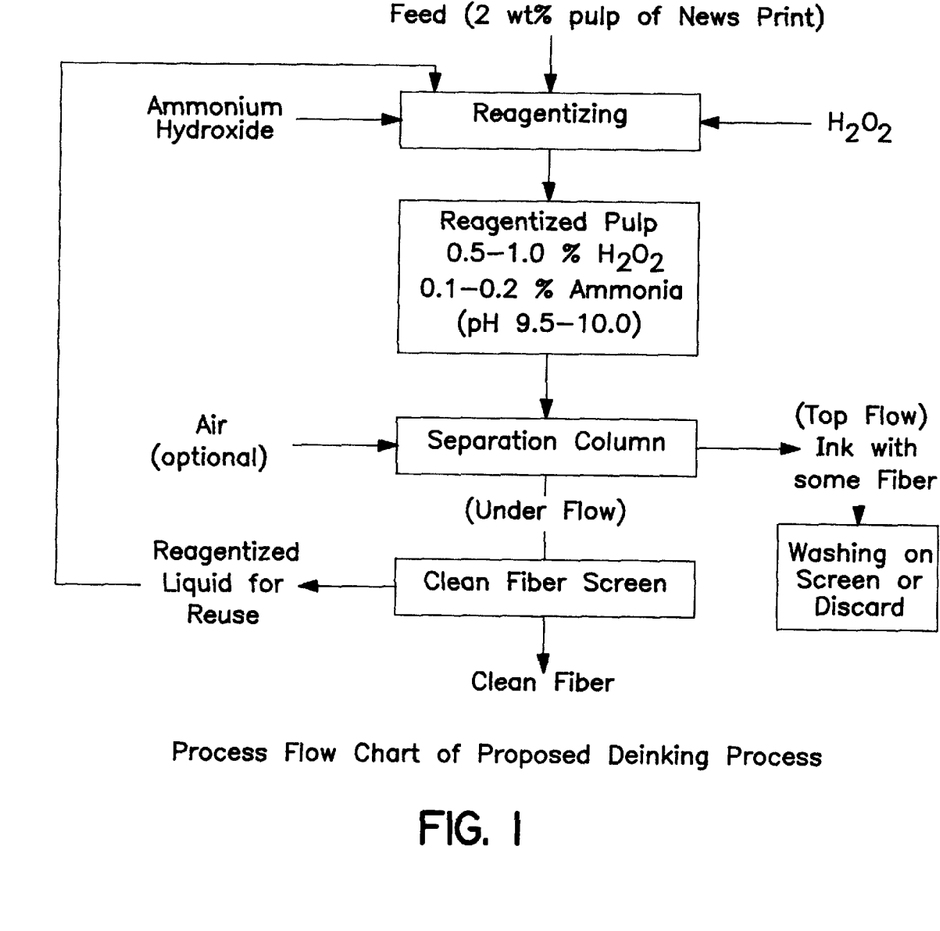
FIG. 1 is a flow chart of a process according to the invention.

FIG. 1 depicts a flow sheet of a typical de-inking process of the invention. The pulp stream is reagentized with 0.5–1.0 wt. % hydrogen peroxide and 0.1–0.2 wt % ammonia as ammonium hydroxide. The pH in this stage is about 9.5–10.0. These reagents undergo a chemical interaction at the fiber/particle interface and generate a bubble of ammonium gas which dislodges the ink particles and floats them to the top of the vessel. The advantage of this process is that it does not use any expensive collectors as in conventional processes. In addition, there is little need to sparge the system with air as the reagents used generate the bubbles necessary to flotate the ink particles. Additionally, unlike conventional reagent schemes which can handle only 1.0–1.2% solids loading during flotation, the method of the invention can handle up to 2.0% solids loading efficiently. This will nearly double the output of any existing de-inking unit (i.e., reduces the equipment size to half). Additionally, the method of the invention can handle a wider variety of recovered paper than conventional process schemes.

It will be understood by those skilled in the art that any combination of soluble peroxide and soluble alkaline agent which reacts in the pulp stream to generate a bubble of gas may be employed in the practice of the invention. In the case described above (FIG. 1), the reagents react according to the following scheme:

$$2NH_4OH+H_2O_2 \rightarrow NH_3\uparrow+2H_2O+O+NH_4^++OH^-$$

The liberated ammonium gas operates to flotate the ink particles to the surface.

The combination of a peroxide with an alkali metal bicarbonate may also be used. These would react according to the scheme:

$$NaHCO_3+2H_2O_2 \rightarrow Na^++OH^-+2H_2O+2O+CO_2\uparrow$$

The liberated carbon dioxide bubbles would then work to float the ink particles to the surface. Since two molecules of nascent oxygen are formed in the system, some will readily combine to form molecular oxygen as well as to bleach the pulp. The molecular oxygen formed would function as an additional flotation agent.

The critical parameters of the method of the invention, therefore, are the use of soluble peroxides and alkaline agents which react under the conditions in the pulp stream to form a gas which bubbles up through the pulp stream and acts to dislodge and float the ink particles present in the pulp stream to the surface.

It is a further feature of the invention that the nascent oxygen released by the reaction between the alkaline agent and the peroxide functions to bleach the pulp and increase its brightness. In addition, the nascent oxygen works to break the oils present in the pulp stream into shorter chain length molecules which function to stabilize the froth in the pulp stream for flotation of the ink particles.

In the cases of combinations of alkaline agents and peroxides which do not react with each other to liberate gas bubbles, the process is much less efficient. For example, where alkali metal hydroxides and hydrogen peroxide are utilized (as in the case of some prior art methods), the reagents react according to the scheme:

$$NaOH+H_2O_2 \rightarrow Na^++OH^-+H_2O+O$$

Although nascent oxygen is formed which aids in brightening the pulp, no gas bubbles are formed to float the ink particles to the surface of the pulp stream. In this case, a gas such as air must be separately sparged through the system to float the particles which increases the overall cost of the system and decreases the efficiency thereof.

Peroxides other than hydrogen peroxide may also be utilized in the practice of the invention. An alkali metal peroxide would react with ammonium hydroxide according to the following scheme:

$$2NH_4OH+Na_2O_2 \rightarrow 2Na^++2OH^-+O+2NH_3\uparrow+H_2O$$

Again, the liberated ammonia gas bubbles would dislodge and float the ink particles to the surface of the pulp stream.

If desired, adjuvants such as polypropylene glycol may be added to the reaction mixture to enhance flotation and increase pulp brightness.

EXAMPLE

Newspaper is first cut into shreds and homogenized. The paper is then pulped at a solids loading of 2 wt. % in a Hamilton Beach blender for two minutes. Hydrogen peroxide is added during the pulping stage at a dosage of 0.5–1.0 wt. % of dry paper. The reagentized pulp is then transferred to a flotation cell and the pH is adjusted to 9.5–10.0 using ammonium hydroxide. The flotation is performed using a Denver flotation unit for fifteen minutes at 900 rpm. The ink particles are collected in the froth using a manual skimmer. The floated ink particles and the de-inked pulp are then filtered at 0.5 atm vacuum. The filtrate is recycled to subsequent flotation experiments to reduce the reagent consumption by recycling the unreacted reagents. The dewatered pulp is air dried in a convection oven at a temperature of 40° for 4–5 hours. In conventional methods, the dewatered pulp is washed and bleached to increase the brightness of the pulp. However, in this example, post flotation processes to increase the pulp brightness have not been performed as they are invariant with the flotation scheme.

Figure 2:
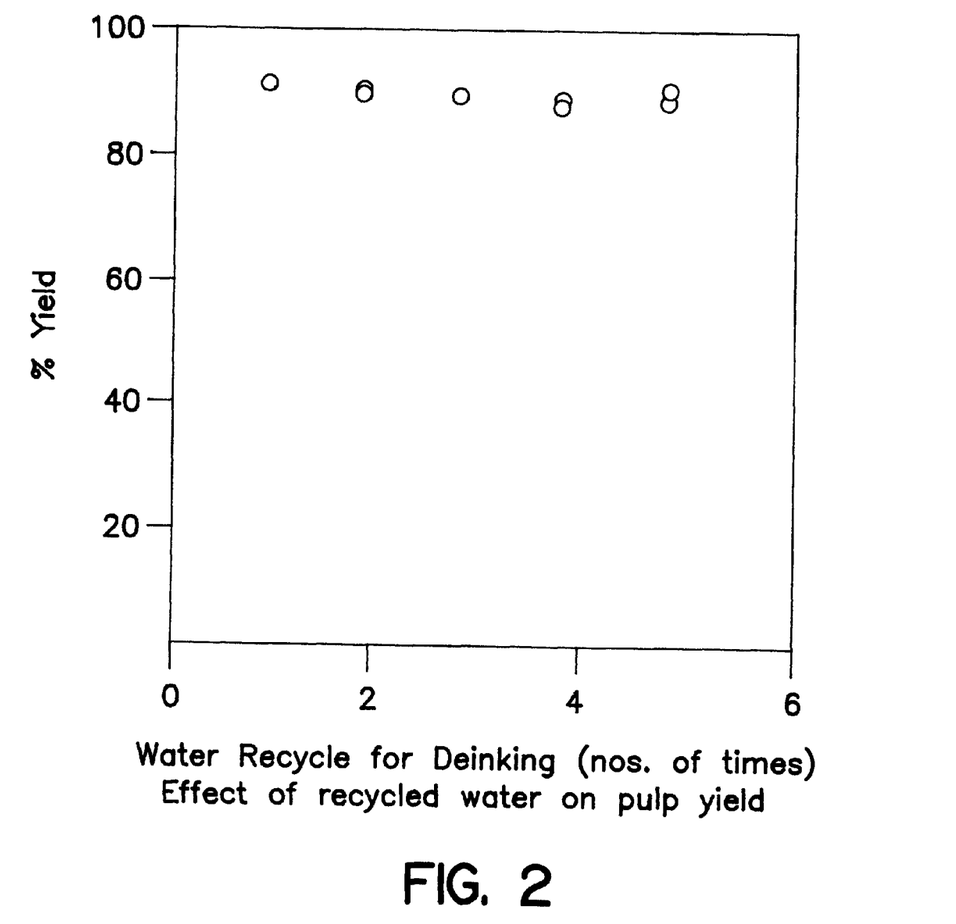
FIG. 2 is a graphic depiction of the effect of recycled reagent liquid on pulp yield.
Figure 3:
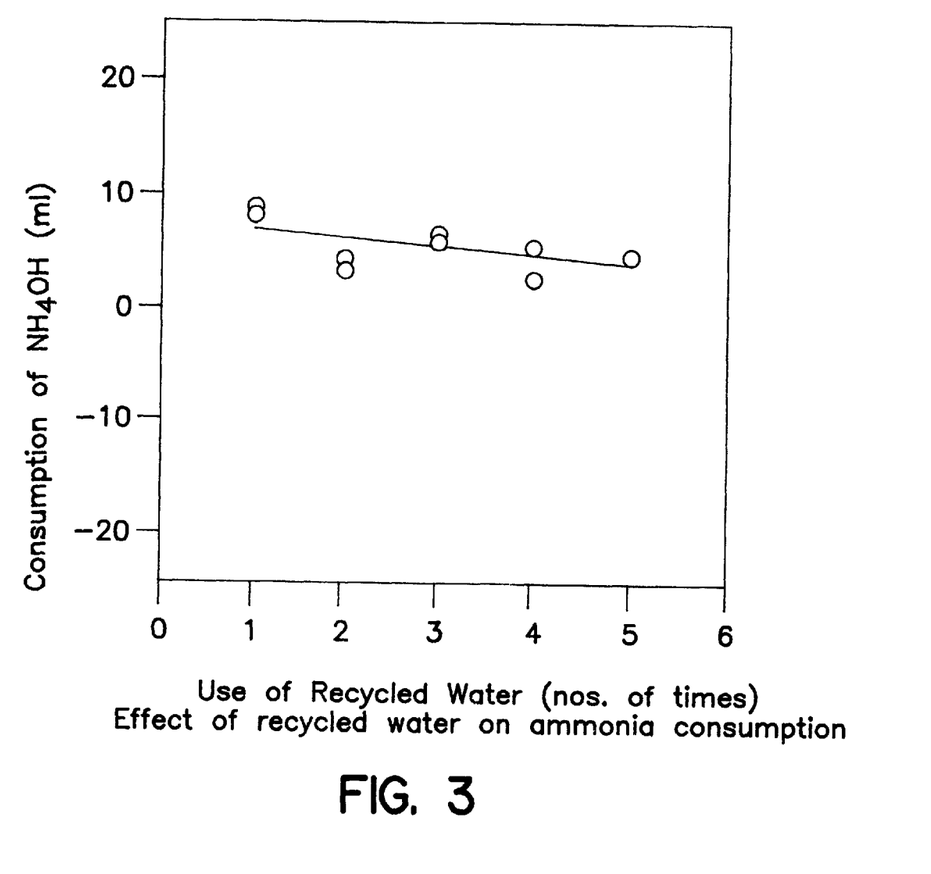
FIG. 3 is a graphic depiction of the effect of recycled reagent liquid on ammonium consumption.
Figure 4:
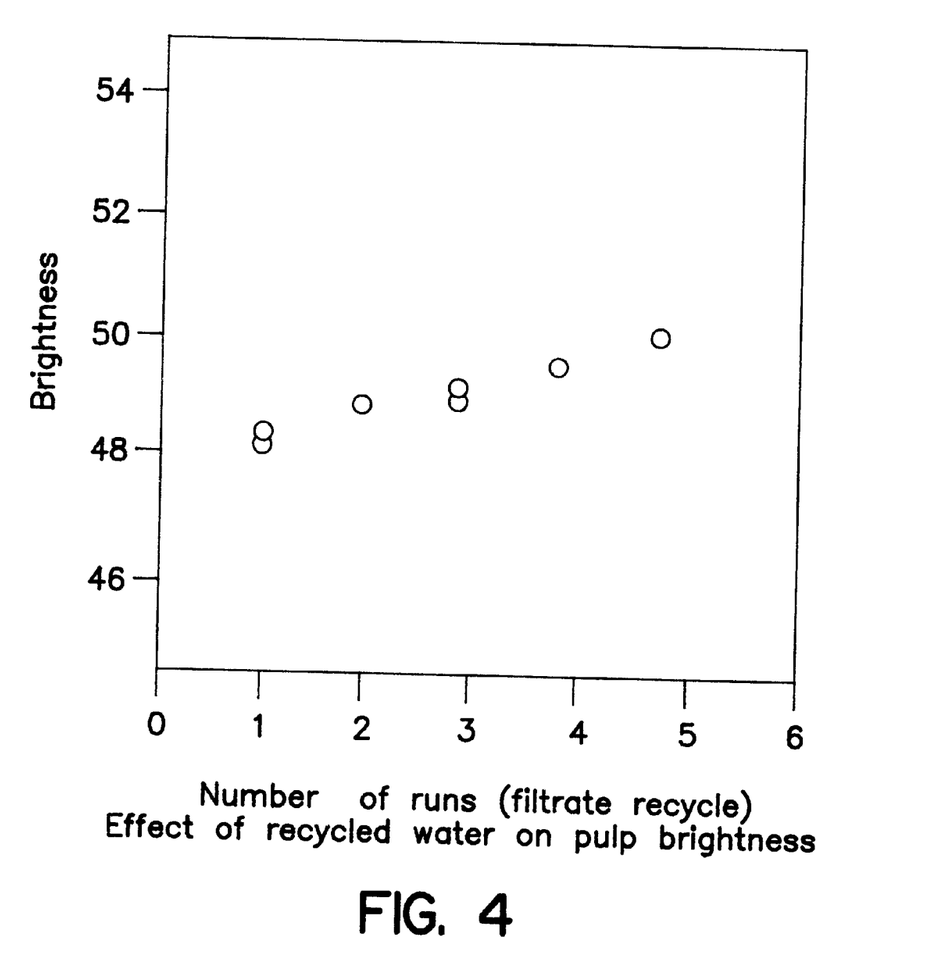
FIG. 4 is a graphic depiction of the effect of recycled reagent liquid on pulp brighteners.
Figure 5:
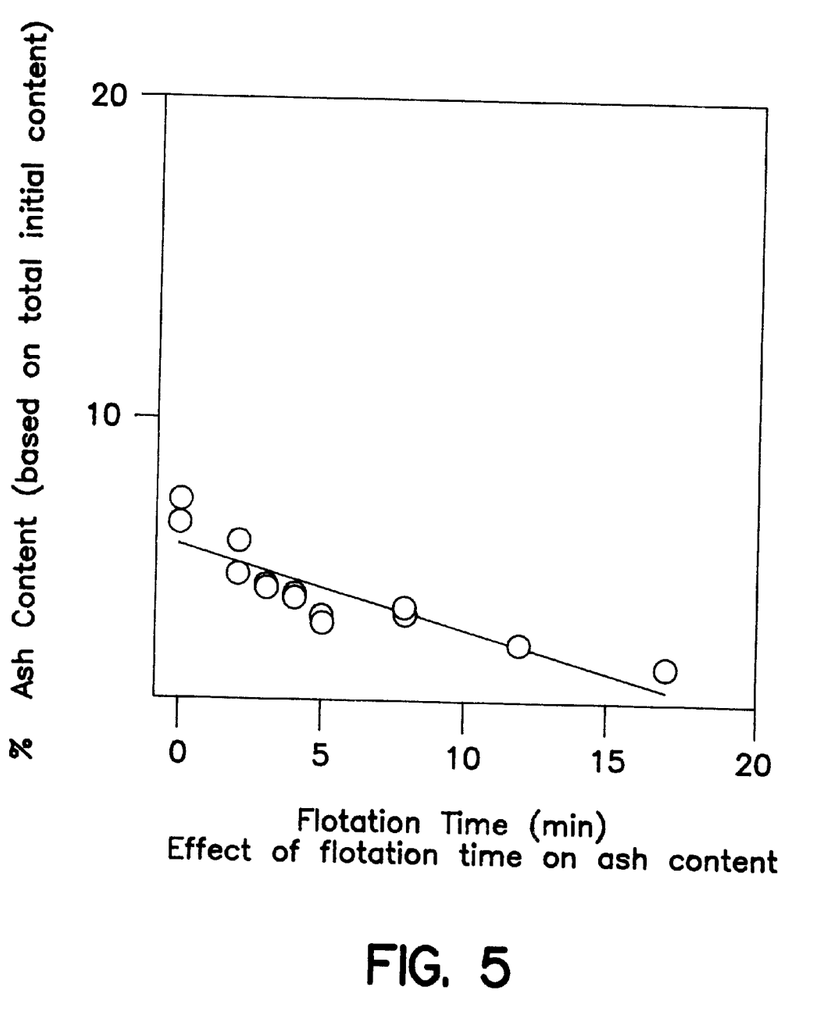
FIG. 5 is a graphic depiction of the effect of flotation time on ash content of the recycled pulp.

High pulp yields (approximately 90%/o) were achieved in this example. As shown in FIG. 2, the pulp yield is not affected by the recycled water. The ammonia consumption was observed to decrease with each cycle indicating that the ammonia does not completely react and can be partially recycled in the subsequent flotation steps (see FIG. 3). The pulp brightness increases with each filtrate recycle indicating that recycling the filtrate is beneficial to the flotation process (see FIG. 4). The key measures of de-inking are yield, pulp brightness, ash content and dirt count. The current process has been demonstrated to produce a pulp yield of 90+% which is much higher than the 74–78% yield achieved in the existing industrial processes. A brightness number of 55 is required for the de-inked newsprint pulp to be successfully recycled. An increase in the brightness number of the pulp from 30 to 50 was observed in this example. The required brightness levels can be easily achieved by a post flotation bleaching step which is a common practice in the industry. As shown in FIG. 5, ash content of the recycled pulp can be easily controlled by varying the flotation time. In the current example, the dirt count was significantly reduced from 65,283 to 14,276/m$^2$ (1,910 to 656 ppm) employing a flotation time of five minutes.

The method of the above example, when repeated utilizing sodium bicarbonate in lieu of ammonium hydroxide, also yields goods results:

| Sample | ONP* | ONP* |
| --- | --- | --- |
| Average Brightness | 49.6 | 51.6 |
| Original Brightness | 55–57 | 55–57 |
| Paper, % | 2 | 2 |
| H$_2$O$_2$, % | 1 | 1 |
| NaHCO$_3$, %** | 1 | 2 |
| Froth Time, minutes | 6 | 6 |

*De-inked Old News Print
**Increasing dosage from 1 to 2% increases brightness.

All dosages including hydrogen peroxide are calculated on the basis of percentage of dry weight of paper and refer to the active ingredients. For example, in the case of peroxide, 0.5% indicates weight of pure peroxide to weight of dry paper.

Although the method of the invention has been illustrated with reference to waste newspaper, it will be understood by those skilled in the art that it is equally applicable to the recovery and de-inking of any inked or printed cellulosic material such as, e.g., magazines and the like.

The de-inking process of the invention is a new reagent scheme which is a novel combination of chemicals and reagents already in use in various sections of the pulping process industry. This reagent scheme can be employed in existing de-inking plants without equipment modifications.

The de-inking process of the invention employs a novel procedure to produce bubbles in situ at the fiber/ink interface which dislodges the ink particles from the fiber surface. This is more efficient than conventional de-inking processes which rely only on mechanical methods to dislodge and liberate the ink particles.

Better liberation of ink particles results in higher yield of de-inked pulp. Additionally, this ensures flotation at higher solids loading. The solids loading used in the current process is 2 wt. %., unlike the existing industrial flotation schemes which operate at a solids loading of 1 wt %. Hence, the current process can double the existing throughput of the industry.

The proposed reagent scheme employs fewer reagents than in current industrial processes and, hence, is less complicated. The build-up of any unreacted reagents in the proposed scheme is beneficial and does not play havoc with, e.g., the environment as in existing industrial processes.

We claim:

1. A method of de-inking cellulosic fibrous materials comprising:
    a. admixing an alkaline reagent selected from the group consisting of ammonium hydroxide and sodium bicarbonate or mixtures thereof with hydrogen peroxide and an aqueous suspension of inked cellulosic fibrous material in amounts whereby said alkaline reagent and hydrogen peroxide react at the ink particle/cellulosic fiber interfaces to dislodge said ink particles from said cellulosic materials; and
    b. removing said dislodged ink particles from said aqueous suspension.
2. The method of claim 1 wherein said aqueous suspension of inked cellulosic material is pulped wastepaper.
3. The method of claim 2 wherein said wastepaper is newsprint.
4. The method of claim 1 including the step of:
    c. removing de-inked cellulosic fibers from said aqueous suspension.
5. The method of claim 4 including the step of:
    d. recycling the aqueous liquid remaining after removal of said de-inked cellulosic fibers to step a.
6. The method of claim 1 wherein said aqueous suspension contains up to about 2% solids loading.
7. The method of claim 1 wherein said aqueous suspension, after admixture with said alkaline reagent and hydrogen peroxide, has a pH in the range of from about 9.5 to about 10.0.
8. The method of claim 1 wherein the amount of alkaline reagent admixed with said aqueous suspension is from about 0.5 to about 1.0 weight percent per ton of inked cellulosic material.
9. The method of claim 1 wherein said alkaline reagent admixed with said aqueous suspension is in the form of a 0.5% to 1.0%, by weight, aqueous solution.
10. The method of claim 1 wherein said dislodged ink particles are removed from said aqueous suspension by flotation.

11. The method of claim 10 wherein said aqueous suspension is sparged with a gas to aid said flotation of ink particles.

12. The method of claim 11 wherein said gas is air.

13. The method of claims 1 or 5 conducted continuously.

14. In a method for recycling waste cellulosic material, the improvement comprising de-inking cellulosic fibrous materials comprising:

a. admixing an alkaline reagent selected from the group consisting of ammonium hydroxide and hydrogen peroxide and mixtures thereof with an aqueous suspension of inked cellulosic fibrous material in amounts whereby said alkaline reagent and hydrogen peroxide react at the ink particle/cellulosic fiber interfaces to dislodge said ink particles from said cellulosic materials; and     b. removing said dislodged ink particles from said aqueous suspension.

\* \* \* \* \*